US011072075B2

(12) United States Patent
Christensen et al.

(10) Patent No.: US 11,072,075 B2
(45) Date of Patent: Jul. 27, 2021

(54) EYE CONTACT SENSING AND CONTROL FOR ROBOTIC CHARACTERS

(71) Applicant: DISNEY ENTERPRISES, INC., Burbank, CA (US)

(72) Inventors: David Loyal Christensen, Glendale, CA (US); Alexis P. Wieland, Los Angeles, CA (US); Lanny S. Smoot, Thousand Oaks, CA (US); Alfredo M. Ayala, West Covina, CA (US); Quinn Y. Smithwick, Pasadena, CA (US); Kyna P. McIntosh, Los Angeles, CA (US); James R. Kennedy, Glendale, CA (US); Matthew K. Pan, Glendale, CA (US); Günter D. Niemeyer, Pasadena, CA (US); Daniel De Jesus Campos Zamora, Los Angeles, CA (US); Sungjoon Choi, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 106 days.

(21) Appl. No.: 16/662,151

(22) Filed: Oct. 24, 2019

(65) Prior Publication Data
US 2021/0122055 A1    Apr. 29, 2021

(51) Int. Cl.
| G06K 9/00 | (2006.01) |
| B25J 1/00 | (2006.01) |
| B25J 11/00 | (2006.01) |
| G06F 3/01 | (2006.01) |
| B25J 9/16 | (2006.01) |

(52) U.S. Cl.
CPC ......... *B25J 11/0015* (2013.01); *B25J 9/1697* (2013.01); *G06F 3/013* (2013.01); *G06K 9/00255* (2013.01); *G06K 9/00604* (2013.01)

(58) Field of Classification Search
USPC ......................... 700/245; 382/154, 103, 190; 318/568.12; 901/1
See application file for complete search history.

(56) References Cited

U.S. PATENT DOCUMENTS

| 6,577,924 B1* | 6/2003 | Kasuga | .................. G06N 3/008 340/7.2 |
| 2002/0198626 A1* | 12/2002 | Imai | ...................... G06N 3/008 700/245 |

(Continued)

*Primary Examiner* — Kathleen Y Dulaney
(74) *Attorney, Agent, or Firm* — Snell & Wilmer L.L.P.; Kent A. Lembke

(57) ABSTRACT

A system for sensing and controlling eye contact for a robot. The system includes a robotic figure with a movable eye. The system includes a light source positioned in the robotic figure to output light through a light outlet of the eye. A light sensor is included that senses light striking surfaces in a physical space in which the robotic figure is positioned including the output light from the light source. The system includes an image processor processing output of the light sensor to identify a location of a target formed by the output light striking surfaces in the physical space and to identify a location of a face of a human. Further, the system includes a robot controller generating eye movement control signals based on the location of the target and the location of the face to position the eye to provide eye contact with the human observer.

17 Claims, 4 Drawing Sheets

(56) References Cited

U.S. PATENT DOCUMENTS

| | | | | |
|---|---|---|---|---|
| 2003/0235335 | A1* | 12/2003 | Yukhin | G06K 9/00201 |
| | | | | 382/190 |
| 2004/0210345 | A1* | 10/2004 | Noda | G05D 1/0088 |
| | | | | 700/245 |
| 2008/0232680 | A1* | 9/2008 | Berestov | H04N 13/236 |
| | | | | 382/154 |
| 2010/0023163 | A1* | 1/2010 | Kidd | G06N 3/008 |
| | | | | 700/245 |
| 2013/0078600 | A1* | 3/2013 | Fischer | G09B 19/00 |
| | | | | 434/236 |
| 2016/0001193 | A1* | 1/2016 | Eck | A63G 31/00 |
| | | | | 446/26 |
| 2017/0209796 | A1* | 7/2017 | Kim | A63H 3/28 |
| 2017/0285757 | A1* | 10/2017 | Robertson | G06F 3/017 |
| 2018/0133900 | A1* | 5/2018 | Breazeal | B25J 19/026 |
| 2018/0277002 | A1* | 9/2018 | Hergenroeder | B25J 9/0003 |
| 2018/0370032 | A1* | 12/2018 | Ichikawa | G06K 9/00664 |
| 2018/0374494 | A1* | 12/2018 | Yamaya | G06K 9/00523 |
| 2019/0070735 | A1* | 3/2019 | Tappeiner | G06K 9/00335 |
| 2020/0412983 | A1* | 12/2020 | Nakata | H04N 7/18 |

\* cited by examiner

EYE CONTACT SENSING AND CONTROL FOR ROBOTIC CHARACTERS

BACKGROUND

1. Field of the Description

The present description relates, in general, to design and control of robots, robotic figures or characters, and/or animatronics that include eyes such as, but not limited to, human-like robotic characters. More particularly, the description relates to a new assembly and method for sensing and for controlling a robotic figure or character (i.e., any robot or robotic system/device with one or more eyes) to achieve desirable eye contact between the robotic figure or character and a nearby person who may be interacting with (e.g., speaking with) the robotic figure or character. The description also relates to new robotic figure/character systems that make use of the new eye contact sensing and control taught herein.

2. Relevant Background

Robots that interact with humans are becoming increasingly popular in numerous and varied applications including the service and entertainment industries. As an example, many entertainment settings utilize robotic devices or animatronics to provide physical embodiments of characters including characters known to the people viewing and interacting with the robotic devices or animatronics. These characters may be from comic books, movies, or television shows such that people may have a deep connection with the characters and have specific expectations of how a robotic device implementing that character should move and behave in the physical world.

In this regard, it has proven difficult to design a robotic character or animatronic that can achieve convincing eye contact with a nearby person. There is a demand now and in the future for robotic figures to be closer up to and interactive with people, and it is likely that robot operators and designers that can provide robotic figures with excellent and natural (or expected for the character) eye contact will be in greater demand. However, eye contact is a very difficult control aspect to do well for a robotic character in part because humans (e.g., nearby interacting people) are so good at sensing whether the eye contact provided by the robotic character is right.

Presently, it can be obvious to an observer that a robotic character is not being controlled or operated to look at a nearby person such as to acknowledge their presence. Often such type of control is used because eye contact is incredibly difficult to perform with present technologies. Humans are good at reading eye contact, and, if the eye contact provided by the robot is off even by a small amount, such as a few degrees, the resulting effect can be worse than not trying. Hence, some implementations use robotic figures that are controlled to perform certain functions without interacting with nearby people (e.g., to mind their own business as if the people are not there). This is unfortunate because the robots in use typically are mechanically capable of providing much better interaction, but these capabilities are not used because eye contact operations or control systems (e.g., sensing and control methods and hardware) were not good enough for many environments.

One solution that has been tried involves putting a camera near the robot, and its captured images are processed to estimate gaze direction of people nearby the robot. This solution typically uses calibration of the system to make the robot's eyes point in the direction in which the camera sees or detects people. A problem with this approach is that since the camera is in a slightly different position than the robot, the angles are not the same, and, as a result, it is desirable in such systems to place the camera as close as possible to the robot. However, even with such close positioning, a calibration, which can change when the camera is bumped or moved, has to be performed, and the control approach also has to compensate for the pose of the robot at any given time. Stack-up errors in the robot from the fixed feet, up the legs, to the neck, and so on can cause the estimate of the robot's angle for such calibration to be incorrect. Any of these issues can result in the eye contact being inaccurate and problematic for a nearby human observer (e.g., the person with whom the robot is supposed to try to make and/or keep eye contact during an interaction).

Due to the deficiencies associated with this solution, others have implemented another robotic character system that attempts to provide realistic eye contact by positioning a camera in the head of the robot instead of at a nearby location. Stack-up errors are much smaller in this system as the camera is physically located very near the robot's eyes, and the robot is typically themed or designed to provide a non-human character such that it can disguise (such as with dark spots) the presence of the camera in the robot's head, which may be difficult in a human-like robotic figure. The stack-up errors are also smaller because the chain of elements from the forehead to the eyes is only one, thereby minimizing stack-up error. One issue with such implementations, though, is they rely on the theming or design of the robot's head to hide the camera. Another issue is that the camera is often limited to one that is very small in size such that it is also low aperture. Further, the tiny camera experiences massive amounts of motion blur during faster animations (i.e., head movements), which makes the robotic character functionally blind during times when it is being moved and results in loss of proper eye contact.

In a human-like robot, many robot developers find the eyes a promising place to position a camera to support eye contact sensing and to support eye contact control. This positioning "feels" right because that is what humans do to maintain eye contact. However, a human eye is completely unmatched by modern cameras in almost every way. For example, cameras with human pupil-sized lenses struggle to see images in dark or low light spaces that is often used to provide entertainment with robotic characters and for other settings. When such cameras are tuned to be able to perceive more in low light applications, large amounts of motion blur results with their use. Since eyes (including robotic character eyes simulating a human or other character) move around a lot in practice, this is a difficult problem to address for robot designers. Human eyes look from point-to-point on a face several times a second performing what is called "saccade." To emulate saccade with a camera in a robotic eye would require a camera to "resettle" after every saccade. It is also technically challenging to pack all the technology associated with a sensing camera within a robotic eye, especially one that is human sized, and to also handle all the wiring and infrastructure that needs to come and go from an already very full area of a typical robotic face.

Hence, there remains a need for an improved robot (or robotic character) design to provide desirable, e.g., human or character-like, eye contact between the robot and one or more human observers who may be relatively close to the robot (e.g., within several feet) and who may interact with the robot over a relatively long period of time (e.g., a few seconds to several minutes or longer).

SUMMARY

In brief, a system is taught that includes a robotic character with one or more eyes that can be moved or positioned to provide enhanced eye contact with one or more nearby humans (or observers or interacting people in the space about the robotic character). The system includes a set or assembly of components that facilitate the eye contact by providing capabilities for sensing proper eye contact and for providing control signals to the eye movement drivers or mechanisms to provide proper eye positioning to achieve eye contact and to provide enhanced eye movement during eye contact with an observer (e.g., including expected saccades, smooth pursuit movements, vergence movements, and vestibulo-ocular movements when the robotic character is controlled to implement a human or human-like character).

In this regard, the inventors recognized that when dealing with a small aperture, such as that provided by a pupil of a robotic eye (or opening/outlet of a shell providing the robotic eye), it is preferable to have a highly directional light source output light that leaves or exits the small aperture than to expect that sufficient light in the environment exterior to the aperture will enter it. The light source may take the form of a tiny, simple, safe infrared (IR) light emitting diode (LED), a Class 1 laser diode, or the like. Alternatively, a structured light source, rather than a single beam source which may allow a face to be "missed" in some cases, may be easily fit within a robotic eye. Such light sources can be operated in a continuous manner or in an on/off sequence known to an image processor to produce an easy to detect beam or structured light emission that will point to exactly where the robotic character is presently looking as the robotic eye aims or targets the output of the light source held within it.

The system includes an external light sensor(s) (e.g., a camera, which is "external" with regard to the robotic character's head, eyes, or other moving portions as in prior systems). The light sensor(s) picks up the output light (e.g., IR light, laser emissions, visible light, and/or other light output by the light source and other sources) in the environment about the robotic character with a lens that can be as large as desired as it is not restricted to low aperture or small size limitations imposed by in-head implementations. The camera's output (e.g., captured images of space near robotic character) is captured for processing. In this regard, the new system further includes a computer connected to the light sensor(s) and to the robot controller (or at least its eye movement drivers/mechanisms) for processing the images to determine a location of a human observer's face and/or eyes on such a located face and to determine the location of the output light. In response, the computer (or its software) or control system, such as a servo control system, generates a control signal(s) to cause the robot's eyes to move so as to locate the output light and, therefore, to direct the robot's eyes onto the location of the human observer's face and/or eyes on this face.

In the specific example of an IR light source positioned in one of a robotic character's eyes, visual servoing is as simple as finding the brightest IR dot in the scene captured by the camera or other light sensor and then moving this IR dot towards a detected face in the same scene. Since the measurement involves sensing the distance between where the robotic eyes are currently pointed (as it coincides with the output of the light source) and where the face is viewed instead of absolute position (as in prior systems), the camera or other light sensor can be put anywhere within the field of view that the system designers choose.

Hence, there is no need to place the light sensor on or in the robotic character's head or to perform calibration as in prior eye contact systems. Without a need for a complex and detailed calibration, the sensor/camera can be bumped or disturbed or even mobile and would still work well for the new system. Since the sensor/camera is stationary (in most cases) and outside the robotic character, motion blur is no longer an issue, which eliminates one of the biggest challenges in prior eye contact systems. This is true even for ultra-fast eye saccades that have proven important to human observers of robots for believable eye contact between the robots and the observers. By inverting the problem, the inventors are now using the robotic character's eyes as the marker (or marker generator) instead of as the sensor and are running image processing on an often larger, more powerful, higher quality camera (or other light sensor(s)) instead of within the most complicated and detailed area of a robotic character's face. As a result, the technical and realistic long-term maintenance calibration challenges basically are removed from the design of a robotic system providing robot-to-human eye contact sensing and control.

More particularly, a system is provided for sensing and controlling eye contact of a robot. The system includes a robotic figure with a movable eye with a front light outlet (e.g., an opening in a spherical shell, a lens, or the like). The system further includes a light source positioned in the robotic figure to output light through the front light outlet of the movable eye. A light sensor is included that senses light striking surfaces in a physical space in which the robotic figure is positioned including the output light from the light source. The system also includes an image processor processing output of the light sensor to identify a location of a target formed by the output light striking one or more surfaces in the physical space and to identify a location of a face of a human in the physical space. Further, the system includes a robot controller generating eye movement control signals for the robotic figure based on the location of the target and the location of the face to position the movable eye to provide eye contact with the human.

In some embodiments, the light sensor is positioned external to the robotic figure. In such embodiments, the light sensor may include a first camera detecting an image of the physical space using the output light and a second camera detecting an image of the physical space using visible light. Further, the image from the first camera may be used by the image processor to identify the target, and the image from the second camera may be used by the image processor to identify the face. The system may in such embodiments also include a beamsplitter positioned between the first and second cameras to receive light reflected from the physical space including a portion of the output light and to transmit a first portion of the received light to the first camera and to reflect a second portion of the receive light to the second camera.

In the same or other embodiments, the light source may be an infrared (IR) light source and the light sensor may be an IR camera. In such cases, the IR light source is mounted within an inner space of the movable eye to move with the movable eye or alternatively can be mounted external to the movable eye and directs light onto a mirror positioned in the inner space. In other embodiments, the light source is a laser and the light sensor is a camera configured to detect light from the laser. In these implementations, the laser can be mounted within an inner space of the movable eye to move with the movable eye or alternatively can be mounted external to the movable eye and directs light onto a mirror positioned in the inner space.

The eye movement control signals can be generated so as to cause an eye movement driver of the robot to position the movable eye to direct the front light outlet of the movable eye toward the location of the face, whereby the target at least partially overlaps the face. The eye movement control signals may operate the eye movement driver to position the movable eye to direct the front light outlet of the movable eye such that the target at least periodically coincides with a location of an eye on the face. In such implementations, the eye movement control signals may further include signals causing the eye movement driver to, during the eye contact with the human, move the movable eye to provide at least one of saccades, smooth pursuit movements, vergence movements, and vestibulo-ocular movements during movements of a head of the robot containing the movable eye.

DETAILED DESCRIPTION

Briefly, new techniques (and associated software/algorithms and hardware) are described that enhance eye contact between a robot or robotic character/figure (as these terms may be used interchangeably) and a human. To this end, the robot includes one or more eyes that can be moved to suit the detected location of the human observer and the positions of their eyes. In contrast to prior eye contact systems, the new techniques generally use an external sensor, such as one or more cameras, positioned external to but nearby the robot so that the external sensor can detect images of the space nearby the robot (e.g., capture images of surfaces and objects in the robot's field of view).

Additionally, and significantly, the new techniques provide a light source onboard the robot that emits light through one (or more) of the robot's eyes so as to create a detectable target (e.g., a dot or area of light) in the space observed by the external sensor indicating the direction that the robot's eye(s) is presently directed (e.g., where the robot is "looking"). The new eye contact techniques further include software and/or algorithms for controlling the robot to move its eyes to shift or position the trackable target or output light from the light source onboard the robot so as to provide eye contact (e.g., to move the trackable target onto the detected face and even to the detected location of the human's eyes). Software/algorithms are further provided to generate control signals to move the robot's eyes after initial eye contact is achieved to provide desired eye movement during an eye contact session (or an interaction between the robot and the human), e.g., to provide expected saccades and vergence movements rather than simply staring at the human as this can also make interaction unrealistic (with regard to expected human behaviors when the robot is simulating a human or human-like characters).

Figure 1:
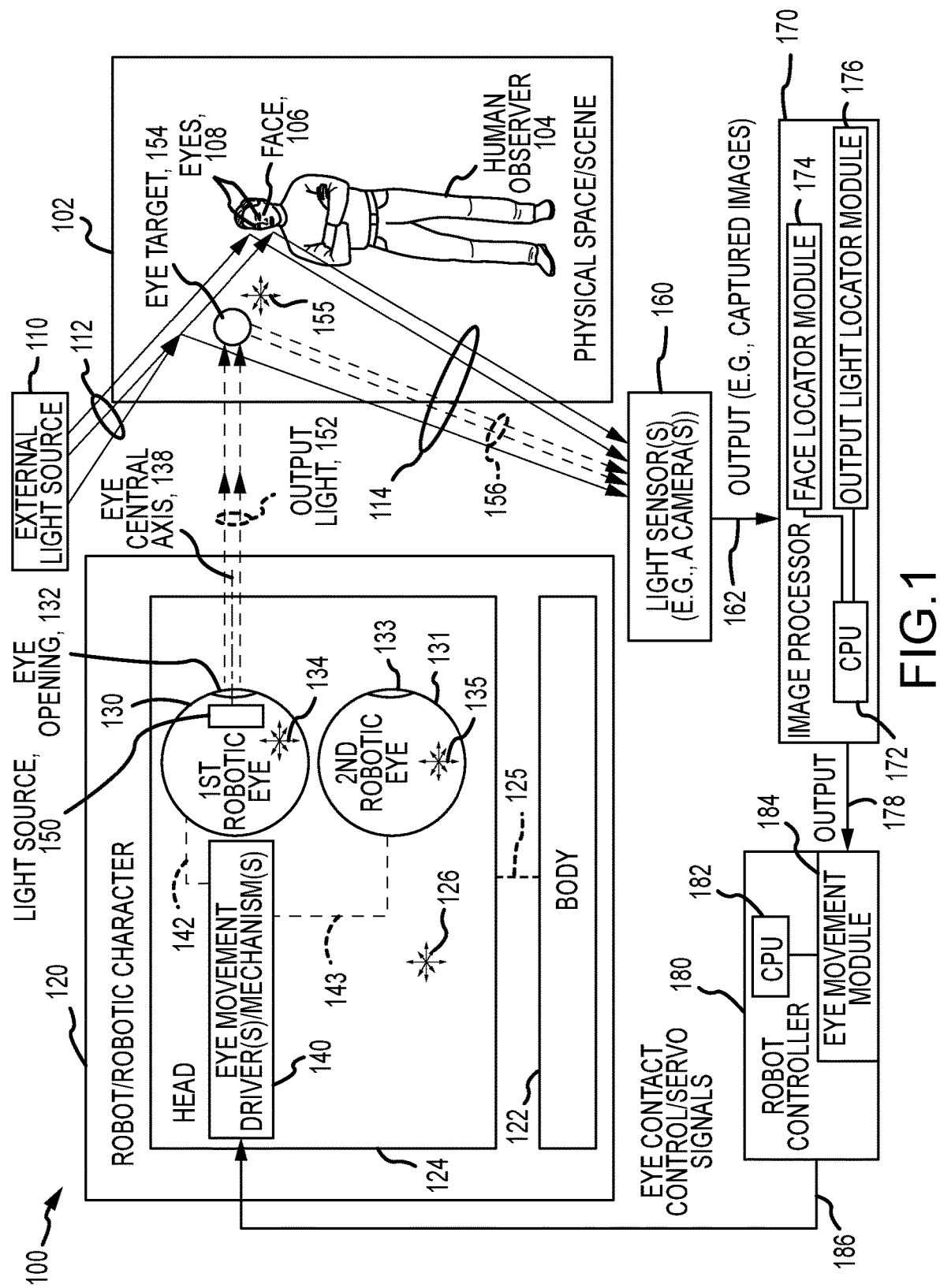
FIG. 1 illustrates a functional block diagram of a robotic figure or character system configured for eye contact sensing and control according to the present description.

FIG. 1 provides a functional block diagram of an exemplary robot or robotic character system 100 configured to implement the eye contact sensing and control techniques taught herein. The system 100 includes a physical space or scene 102 in which interaction may occur between a robot or robotic character 120 of the system 100 and one or more humans/people with a single human observer/viewer 104 shown to ease explanation. The human observer 104 may move about the physical space/scene 102 over time (e.g., during an interaction with the robot 120). An external light source 110 provides light 112 (e.g., visible light) that illuminates the scene 102 including the human observer 104 and their face 106. The system 100 includes a light sensor(s) for visible, IR, laser, and/or other light (such as a camera(s)) 160 that receives light 114 reflected from the scene 102 (including the face 106), and the light sensor output 162 (e.g., images of the space/scene 102) are transmitted to an image processor 170 for processing.

The image processor 170 may take the form of nearly any computing device that is adapted to provide the functions described herein. In general, the image processor 170 may include one or more processors 172 running or executing code to provide a face locator module 174 and an output light locator module 176. The face locator module 174 may take the form of a presently-available or yet-to-be-developed software package useful for identifying and locating human faces within a still or video image such as the face 106 of human observer 104 from the output 162 from light sensor 160. Typically, the face locator module 170 may further process, as is well known in the field, the image data 162 once a face 106 is located to determine the location of the observer's eyes 108 upon the face 106 (or this calculation can be performed by another piece of software such as the eye movement module 184).

The system 100 includes a robot or robotic character 120 that may be positioned physically in the space/scene 102 or so that the robot 120 can view the space/scene 102 during its operations (e.g., within its field of view). The robot 120 may take nearly any useful form factor as long as it includes at least one positionable/movable eye for use in making eye contact such as with observer 104. The new eye contact sensing and control techniques are particularly suited for use in human and human-like robots, but the robot does not need to be a human-like robot to practice the concepts taught herein. Generally, though, the robot 120 may include a body 122 upon which is mounted (as shown with dashed line 125) a head 124 (with this term intended for very broad construction), and the head 124 may be movable in one-to-many directions as shown with arrows 126 upon the body 124.

Within or upon the head 124, the robot 120 includes a first robotic eye 130 and a second robotic eye 131 (although only one eye is required and more than two may be included, too). Each eye 130, 131 includes an opening/outlet 132, 133 in its outer shell/body (which may be spherical in shape as shown in FIG. 1) such as in the form of a lens provided in the outer spherical shell/body (and/or a pupil controlling the size of the exposed surface area of the lens as in humans) to allow light in and out of the outer shell/body. Within the head 124, the robot 120 further includes an eye movement driver(s)/mechanism(s) 140 that is coupled to the eyes 130, 131 as shown with dashed lines 142, 143, and the driver 140 is configured for selectively moving (independently and/or together as a linked pair) the eyes 130, 131 as indicated with arrows 134, 135. The system 100 further includes a robot controller 180 with a processor 182 running/executing code to provide an eye movement module 184 that generates control signals 186 that are provided to the eye movement driver/mechanism 140 to initiate and direct the movements 134, 135 of the eyes 130, 131. The robot controller 180 may be provided on/in the robot 120 or as a separate component of the system 100, and the image processor 170 may be provided in a computer used to provide the controller 180 or as a separate component of the system 100 as shown with wired or wireless communications between the various components.

The system 100 is adapted to provide eye contact sensing. To this end, a light source 150 is provided in the head 124 and arranged/oriented so that its output light 152 is directed along the central axis 138 of the first robotic eye 130 through the eye opening 132 (e.g., through the eye's lens or an opening in the outer shell/body). Even when output light 152 is not visible to the observer, it is directed in what the observer would perceive as the gaze direction of the robotic eye 130. In some embodiments, the light source 150 is positioned in the inner space of the outer shell/body of the eye 130 as shown in FIG. 1 while other embodiments may position the source 150 outside the shell and provide optical components to direct the light along axis 138 (such as by providing a mirror inside the eye 130 and light generation portion of source 150 outside the shell/body of the eye 130). The light source 150 may take a variety of forms to practice the invention such as a source that provides the output light 152 as structured light or a source that provides light 152 as a beam such as Class 1 laser, an LED (e.g., an IR LED), or the like.

The output light 152 enters the space 102 (when the robot 120 is looking toward the space/scene 102 or the eye 130 is aimed or oriented to have the opening 132 face the space/scene 102), and it forms a target or illuminated area 154. The light source 150 is mounted in the outer shell of the eye 130 so that when the eye 130 moves as shown with arrows 134 so does the output light 152 and the resulting area 154 as shown with arrows 155. Light 156 reflected or transmitted from the target 154 (or surfaces in space illuminated by the light 152) is sensed or received by the light sensor(s) 160 (e.g., a visible light camera, an IR camera, a camera configured to detect light in the spectrum of light 152, or the like). Hence, the output 162 may include an image including an image of the target 154.

The image processor 170 includes an output light/target locator module 176 that functions to process the sensor output/images 162 to determine a current location of the target 154 in the space (or within the received image). The detected present location (e.g., X-Y coordinates or 3D or X-Y-Z coordinates) is passed with the location of the face 106 determined by the module 174 (or an overlay of the two images providing the located target 154 and face 106) to the robot controller 180. The eye movement module 184 determines the relative location of the target 154 to the face 106 (and, in some cases, the eyes 108 on the face 106), and the module 184 responds by generating eye contact control signals 186 that are transmitted to the eye movement driver/mechanism 140 to cause it to move the eye 130 (and typically eye 131) as shown with arrow 134 (and 135).

The movement 134 is chosen by the module 184 to cause the target 154 to coincide with the location of the face 106 (and, typically, at least at some times during an interaction session/event with the location of the eyes 108) to provide desired eye contact between the eyes 108 of the human observer 104 and the eyes 130, 131 of the robot 120. Once initial eye contact is achieved, the eye movement module 184 will continue to determine the relative location of the target 154 and the face 106 and/or eyes 108 to retain eye contact and/or provide desired movement 134, 135 of the robot's eyes 130, 131 during an interaction session between the robot 120 and the human observer 102 (as explained below in more detail). This continued tracking is also useful for accounting for movement of the robot 120 including movement 126 of its head 124, which will cause movement of the eye 130 and the target 154 without responsive movement 134 of the eye 130 by the eye movement module 184. The continued tracking/sensing is also useful for accounting for movement of the human observer 104 during the interaction session, e.g., to keep the eye target 154 co-located (at least at some times) with the face 106 and/or the eyes 108 even when the human observer 104 moves within the space/scene 102. For example, the control signals 186 may be generated by the module 184 to provide smooth-pursuit movements of the eye 130 (and, typically, eye 131) to cause it to follow movement of the human's face 106 by moving the target 154 to track/follow the face 106 in the space 102.

Figure 2:
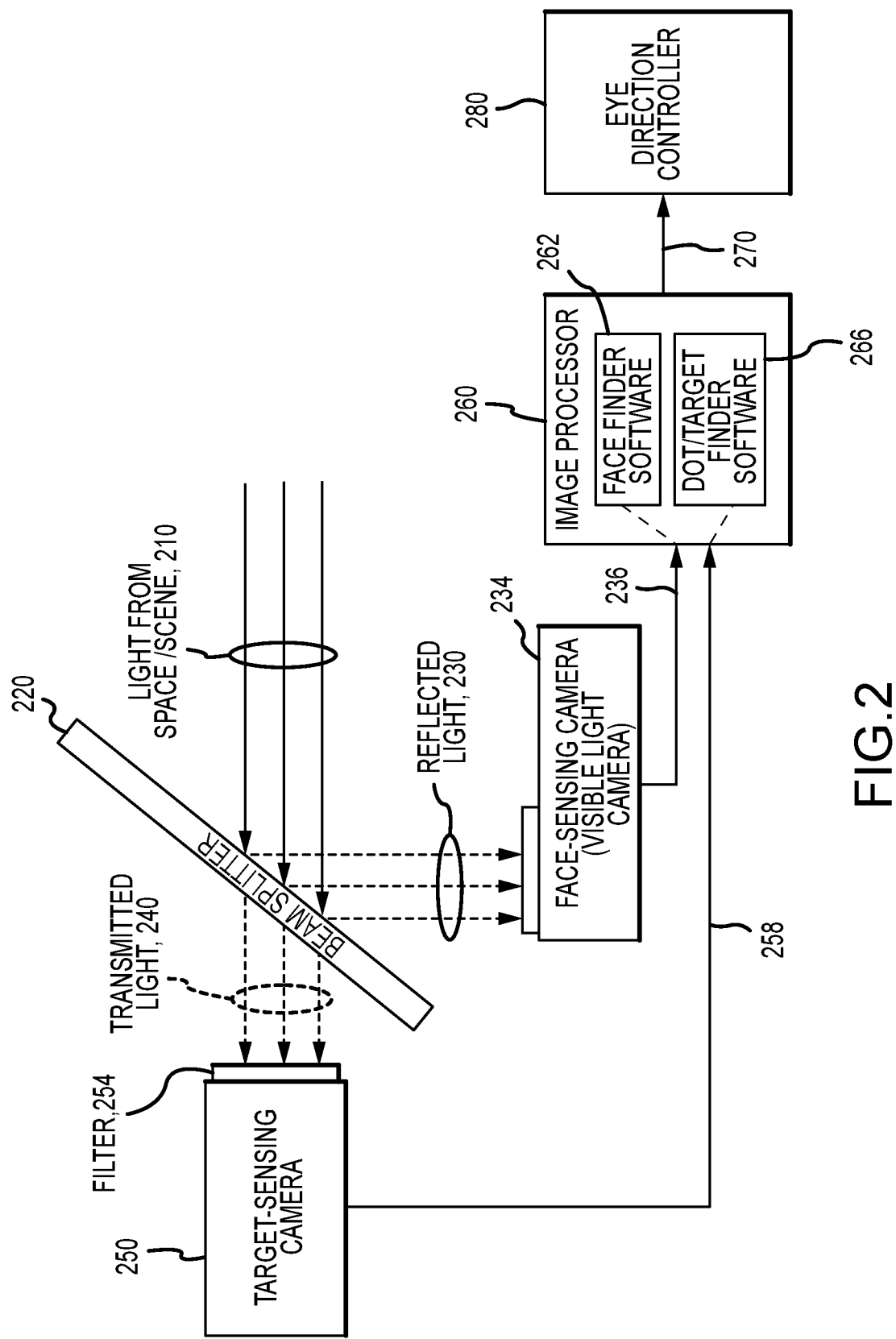
FIG. 2 illustrates a functional block diagram of an assembly of components that may be used within a robot system, such as the system of FIG. 1, to facilitate eye contact sensing and control.

FIG. 2 illustrates a functional block diagram of an assembly of components that may be used within a robot system, such as the system 100 of FIG. 1, to facilitate eye contact sensing and control. Particularly, the system 100 of FIG. 1 is shown to include a light sensor(s) 160. This may be implemented as shown in FIG. 2 through the use of a beamsplitter 220 that is positioned near the space/scene 102 so as to receive light 210 from the space/scene. The beamsplitter 220 is configured to reflect a light 230 toward a face-sensing camera 234, which may take the form of nearly any camera of desired quality and/or performance in generating images 236 (still or video) useful for facial recognition and/or location processes, and, in this regard, the camera 234 typically produces an image 236 based on visible light.

The beamsplitter 220 also transmits a portion 240 of the light 210 toward a target-sensing camera 250, which is configured to generate an image 258 using light of the type output by the light source provided in the robot's head or in its eye. For example, a filter 254 (e.g., a narrow band filter or the like) may be provided over or next to the lens of the camera 250 to filter out all (or nearly all) light except for the type produced by the light source. So, when the light source in the robot is an IR LED or other IR light source, the filter 254 may filter all light out except the IR light output by the light source. When the light source is a laser, the filter 254 may be chosen to pass through a spectrum (such as 633 micrometers) matching that of the laser light source. Alternatively, or in addition, the camera 250 may be selectively sensitive to wavelengths of light 210 and/or the image of light 210 emphasized during image post processing or digital filtering. As another alternative, light 210 may be modulated with data that enables the reflection to be identified in image 258 by corresponding demodulation. Hence, the image 258 is formed only (or nearly so) of light matching the type of light output the light source in the robot.

The output 236, 258 from the two cameras 234, 250 is fed to an image processor 260. The image processor 260 runs or provides face finder software 262 that processes the image from the face-sensing/visible light camera 234 to detect the presence of a human face and its location in the image of the space. The image processor 260 also runs or provides dot/target finder software 266 that detects the presence of the target/area of output light from the light source in the image provided by the target-sensing camera 250, e.g., to detect the brightest spot or area of IR light or laser light in the image 258, and its current location. The image processor 260 provides its output 270, which may be or include an overlay of the two images 236, 258 or otherwise provide relative positioning of one or more faces and the detected target/dot created by the eye-based light source. The output 270 is taken as input by an eye direction controller 280 that uses the relative positioning of the target and one (or more) of the detected faces to generate eye movement control signals that are transmitted to an eye movement driver/mechanism to move a robot's eye(s) to achieve a desired eye contact (e.g., to move the detected target to be on/overlap or be nearer to a located face and/or to move relative to that face over time during a robot-to-person interaction session).

Figure 3:
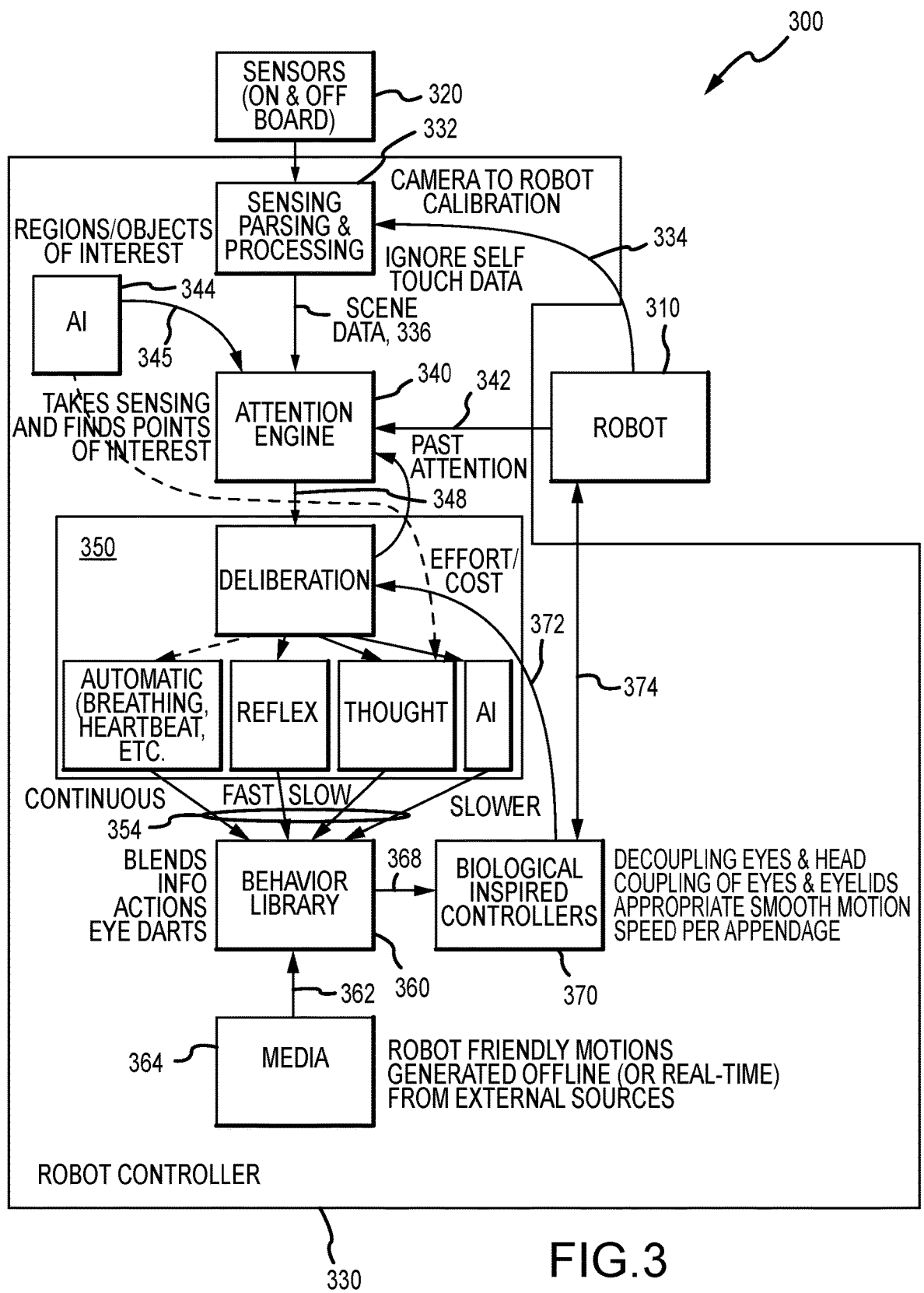
FIG. 3 illustrates a functional block diagram of a robot controller (or eye direction controller or eye movement controller) that may be used in a robot system of the present description such as in the systems shown in FIGS. 1 and 2.

FIG. 3 illustrates a functional block diagram a robot system 300 that may be used to provide improved eye contact and/or movement while interacting with a nearby human (not shown but understood from FIG. 1). The system 300 includes a robot 310 that may take the form of robot/robot character 120 of FIG. 1 and, generally, includes a head, movable eyes, an eyelid for each eye, and appendages (in some cases). The system 300 also includes sensors 320 that may be on and off board the robot 310, e.g., the light sensors 160 shown in FIG. 1, the cameras 234, 250 shown in FIG. 2, and the like. Additionally, the system 300 includes a robot controller 330 that may provide at least the functionality of the robot controller 180 of FIG. 1 along with the image processor 170 and/or the eye direction controller 280 of FIG. 2 with the image processor 260.

The robot controller 330 includes a module 332 for sensing, parsing, and processing input from the sensors 320 based on calibration of such sensors (such as an IR camera, a visible light camera, and so on) with the robot 310. Note, "modules" herein may be made up of software, firmware, and/or hardware for performing the described functions. The sensing, parsing, and processing module 332 processes the sensor output (such as discussed for image processors 170, 260 of FIGS. 1 and 2) to generate scene data 336, which may include one or more identified and located human faces and a location of a target in the field of view of the robot 310 generated by a light source in the robot's head (e.g., in one of the robot's eyes).

The robot controller processes the scene data 336 and, in response, generates control signals 374 to control operations of the robot 310 including eye movement to achieve desired eye contact during interactions with nearby humans (and when no humans are present). To this end, the robot controller 330 includes an attention engine 340 that processes the scene data 336 to determine one or more points of interest 348 that may include a particular human's face in the field of view of the robot 310. The robot controller 330 includes an artificial intelligence (AI) module 344 that generates a set of regions or objects of interest 345 for the robot 310, and, as noted above, this set may include human faces, and the attention engine 340 may choose one or more points of interest 348 for the robot 310 at the present time (and scene sensed by sensors 320).

The robot controller 330 further includes a processing (or deliberation) module 350 that processes the points of interest 348 based on various parameters to choose how to provide attention to the one or more points of interest 348. This decision 354 determines how the robot's movements are controlled including movement of the eyes to provide eye contact on or with one or more of the points of interest 348. The decision 354 may involve continuous actions such as breathing, heartbeat, and so on for the robot and eye movement when no specific object/face is identified for attention. The decision 354 may be a reflex indicated fast action/movement such as a smooth-pursuit movement of the eyes to follow an object or face moving through the robot's field of view. The decision may be a thought/slow movement such as to generally fix the eyes upon a person's face in the points of interest but with saccades, vergence, and/or vestibulo-ocular movements (to compensate for head movements of the robot). The decision may also be based on input from the AI module 344 and involve slower movements (e.g., slower eye movements).

The decision 354 from the processing module 350 is fed to a behavior library module 360 along with output 362 from a media module 364. The media module 364 provides sets of motions that are robot friendly (performable) by the robot 310, and these may be generated offline from external sources or generated by the module 364 in real time. The behavior library module 360 blends or processes the inputs 354 and 362 to generate eye movements 368 including eye darts (or saccades) that are provided to one or more biological-inspired controllers 370, which generate the final control signals 374 for the robot 310 (and to provide feedback 372 in the form of effort/cost in a biological sense for the robot 310 to the deliberation/processing module 350). The biological-inspired controller 370 may perform, as part of generating the final control signals 374, functions such as decoupling eye and head movements (e.g., maintain eye focus/direction on a point of interest even as head moves), coupling of eye and eyelid movements (e.g., center eye direction when blinking, partially close eyelid during particular eye movements, and so on), providing appropriate smooth motions (e.g., smooth pursuit movements with eye drivers, avoid jerky eye movements, and the like), and providing control over speed of each robot component/appendage (e.g., move eyes during eye contact and an interaction session at speeds matching or slower than those expected of a human or other character being simulated with the robot 310).

Figure 4:
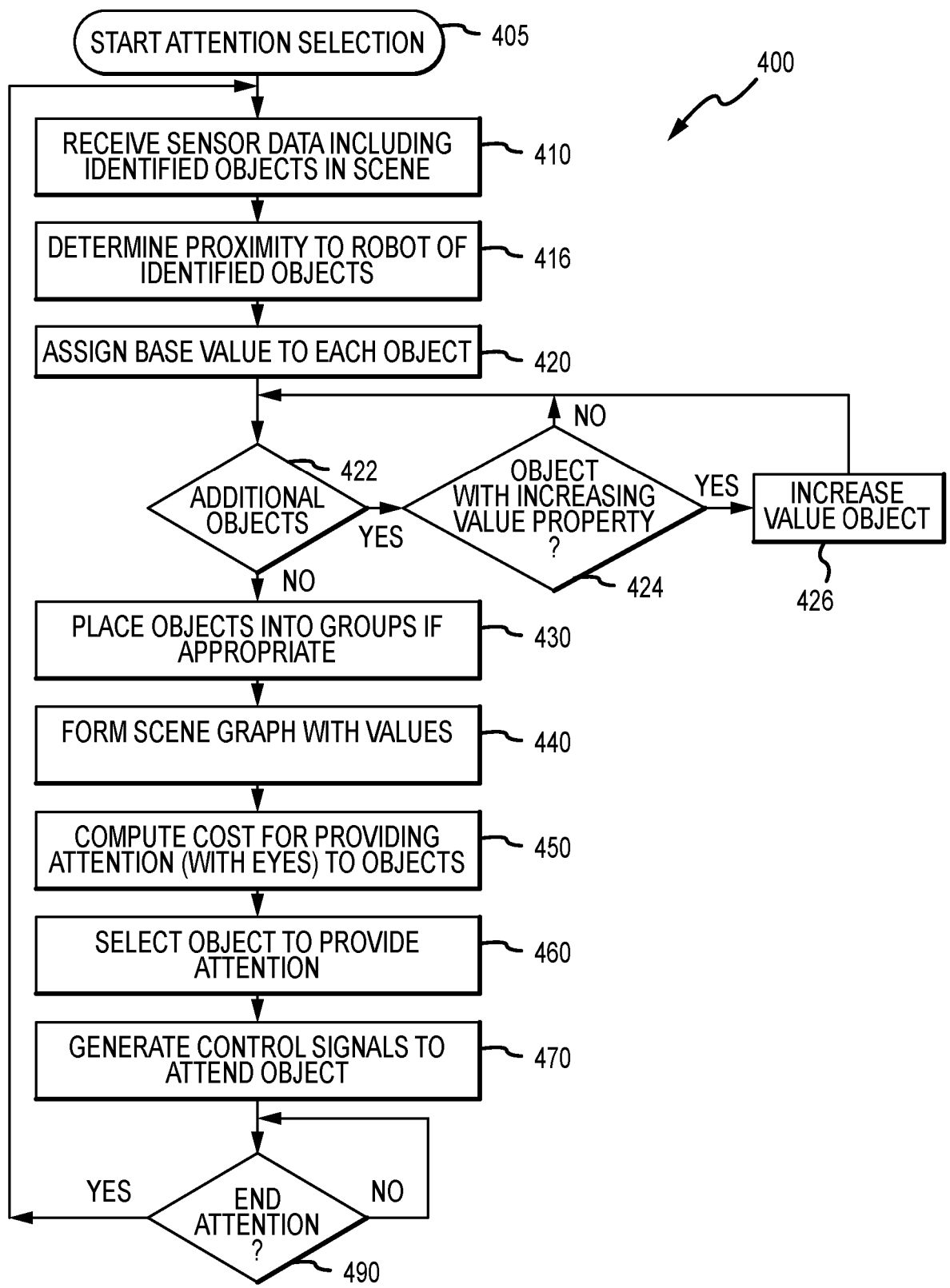
FIG. 4 illustrates a method or algorithm performed by a robot controller in determining where a robot should direct its attention.

FIG. 4 illustrates a method 400 of selecting an object or objects for attention or points of interest for a robot and, hence, where it should direct its eyes (make eye contact with the object that is being attended to). The method 400 may be carried out, for example, by the attention engine 340 of the controller 330 in FIG. 3, and the output of the method 400 may be used to move and/or aim (or direct or target) a robot's eyes. In some implementations, the method 400 is a market-inspired algorithm for where to direct a robot's attention upon at various times during the robot's operations and interactions with humans. The method 400 starts at 405 such as with loading appropriate software onto a robot controller and with defining parameters for use during the method (or loading a definition set into the controller's memory) such as objects of interest, weights or value increases for various object properties, time periods to give attention to differing objects, and the like.

The method 400 continues at 410 with the controller receiving sensor data such as images from an IR camera and a visible light camera, which may be preprocessed to identify objects in the images or the controller may perform this object identification in step 410. Then, at step 416, the controller (or a preprocessor such as image processor 170 of the system 100 of FIG. 1) acts to determine a proximity (or distance) between each identified object and the robot (or, in some cases, an amount the robot's eyes would have to turn to be directed at the identified object). The method 400 continues with step 420 by assigning a base value to each identified object 420. In the method 400, every object may be assigned a base value corresponding to the type of object and, typically, based on its current proximity to the robot (or amount of eyes of a robot would have to turn/move to be directed at the object). The type of object may also be determined in step 410 or in a separate step by the controller or by a preprocessing step (e.g., by a face identification routine). For example, people may be assigned higher base values than many other objects (such as a rock or other portion of the physical environment) when these other objects are at the same distance from the robot as the people, but very close rocks or other non-people objects may be assigned a higher base value in step 420 when they are very close or proximate to the robot when compared with farther away people. In some cases, the proximity value (or separation distance) is a multiplier to the object type value assigned (e.g., reduce object type value by 10 percent with every 3 feet further away or the like).

The method 400 continues at 422 with processing each object to further modify or set the assigned value. If there are more objects to process at 422 (or objects not yet processed), the method 400 proceeds at 424 with determining whether the object has any increasing-value properties associated with it. If yes, the value assigned to the object is increased at step 426. If no, the method 400 continues with a next object check at step 422. In step 424, objects can have properties that increase their value by a preset amount or percentage, and these properties may include: (a) bright colors; (b) high contrast colors; (c) light; (d) sound; (e) rarity of object; (f) motion of object; (g) amount of motion specifically in the direction of the robot; (h) an object that people in the field of view are looking at; (i) a body part that people tend to look at such as eye, nose, mouth, hands, and so on; (j) if the object is part of a person, whether the object is facing the robot, looking at the robot, communicating intent, making gestures, and has a personal relationship with the robot (friend, foe, or the like); (k) whether the object is part of a group that has its own interest; and (l) whether the object has had any attention from the robot and has been identified yet with a glance from the robot (even though the controller knows what the object is already with a wide field of view camera or volumetric camera array).

When all objects are processed for possible increasing of their assigned values, the method 400 continues with step 430, which involves a determination of whether or not the objects should be placed into one or more groups. Objects can be a part of a group. For example, the eyes, nose, mouth, ears, and hands that humans tend to look at are grouped within a particular human, and multiple humans in close proximity may also be associated with a group that could be given attention from the robot as a whole. The method 400 continues with step 440 of forming a scene graph with the now assigned values and groupings. The values are all calculated, in some cases, with individual modules and then put into a scene graph. The scene graph is used to store all the objects that can be attended to in a scene. The "value" assigned to an object may be just a standardized unit or, in some cases, the length of time a human might pay attention to that kind of object (e.g., which may be based on intuition of the designers of the robot or its controller).

The method 400 then involves, at 450, computing a cost associated with providing attention to each object (e.g., of directing the robot's gaze toward the object for eye contact). The cost may be associated with moving the robot's eyes, and other body parts as necessary to provide the object attention, towards the object to attend to it. The cost may include the time it would take to get the eyes to the object and/or the amount of "muscle" effort that would be required (note, eyes move easily, the head is typically harder to move so its movement involves a higher cost, the torso is even higher in cost to move, and repositioning legs and so on may be a still higher cost). The cost may be based on the motors of the robot for power cost or based on models of what muscles would have done that includes fatigue, strain, and pain. Moving your eyes quickly for a glance is easy, for example, but for continued attention it may be better to move one's head instead. While objects within groups could have a reduced movement cost to keep a focus of attention within groups, groups also tend to be close to each other by their nature so this modification to the calculation may not be required in all cases.

The method 400 continues at 460 with selecting the object (or group of objects) to provide attention with the robot (e.g., by moving the eyes to be directed on or aimed toward the object). With all the costs and values calculated, the robot controller can make a choice as to what to attend to based on cost and value. The method 400 may then continue at 470 with generating the control signals needed for the robot to attend the chosen object (e.g., to move the eyes). At step 490, the controller determines whether or not to end attention (or an interaction session), and if yes, the method 400 continues with repeating step 410. As an object is being attended to, its value may be reduced or dropped over time by the controller (in step 490), which makes it possible for another object to take priority such that instead of returning to step 410 the method 400 may involve repeating step 460 to identify a higher priority object for attention.

The drop in value could be based on a time constant that is derived from its base value (e.g., if the unit of the base value is time, that time might represent a time constant of exponential decay that continues for the duration of attention/interaction). Once an object has been attended to and released from attention by the robot controller, its value can begin to rise again so that it can be chosen for attention again when appropriate. The time it takes to rise again could be a property assigned to the type of object or be based on its base value (note, objects that have low value do not need to be reexamined near as often as objects that have high value, so perhaps the rise time may be the reciprocal of the base value).

Generally speaking, the algorithm 400 will maximize net value achieve over time. If the robot is already attending an object, this is the value of the object at the current time, but, if the robot controller sees that there is value to be gained from attending to another object (even considering the cost to move to it), the robot controller will make the switch in the robot's attention. A randomness parameter may be included so that the robot does not always behave in a predictable manner (e.g., always give attention first to a particular object).

The robot controller can be constructed so that all or a subset of these parameters can be tuned. In this way, a robot designer can tune the character of the robot. For example, nervousness could be represented by a reduced cost of motion, an equalization of all base values so that everything is looked at (given attention), and/or an increased sensitivity to motion. In another example, sleepiness could be represented by a higher cost of changing targets/objects of attention, a slower speed between targets, and/or longer attention times for every object.

As discussed with reference to FIG. 1, the light source may be in the eye (e.g., inside a hollow spherical shell) and mounted so as to rotate with the eye of the robot. In other cases, though, the light source (e.g., an IR LED or laser) is positioned outside of the eye and a mirror is placed in the eye. In such embodiments, the light source directs its output light through an opening or lens in a rear or side portion of the outer shell or eyeball structure, and the mirror is oriented to direct reflected light out of the front opening or lens of the eye (e.g., along the center axis of the eye as discussed with reference to FIG. 1).

The power supply for the light source may be provided within the eye/shell, such as in the form of a battery for an IR LED or similar light source. In other cases, though, it may be desirable for the power supply to be provided outside of the eye/shell. For example, the light source may take the form of a laser that is positioned within the eye/shell and a coil may be provided outside the eye to power the laser. In other cases, the induction or other passive power techniques are used to power the light source positioned in a rotating or rotatable eye.

In some embodiments, the light source and the sensor is also provided within the eye instead of being external to the robot as shown with sensor 160 in FIG. 1. The inventors recognized that eyes are reflective or even retroreflective in some cases so that the eye-based sensor (e.g., a camera) can be used to provide face finding in some implementations rather than requiring more powerful face identification software/hardware as was shown in FIG. 1 with cameras 160 and face locator module 174. In this alternative embodiment, the light source in the eye provides a broad angle of output light rather than a beam/spot to more fully light up the area around the robot (e.g., the robot's field of view). The camera in the eye is then used to sense when two spots, which correspond to a persons spaced-apart eyes (or pupils) reflect light via retroreflection or the redeye or cat eye effect, are present and where in the robot's field of view. The robot's controller may then take the location of these two spots/eyes of a nearby human to provide desired eye contact by moving the robot's eyes based on the location of these identified spots/eyes (e.g., to center the two spots/eyes in the eye-located camera's captured image for initial eye contact and then with eye movement during an interaction session as discussed with reference to FIG. 3).

There are many techniques and/or modifications that can be made to the robot systems taught herein to handle toe-in or vergence movements of the eyes. These movements of the robot's eyes are desirable when an object that is the point of interest (such a person's face or their hand or the like) is positioned in close proximity to the robot's face.

In one embodiment, the source of light provided in the eye of the robot is chosen to put out a light (e.g., a cone of light) at a known energy spectrum (such as 38 kHz or the like), and each of the robot's eyes (or one with the other being controlled to have similar vergence or toe-in movements) is configured with three, four, or more receivers (e.g., 38 to 40 kHz receivers in the present example) positioned about a center axis of the eye. The eye is then moved or controlled to center the receivers using the received reflection of the output light from the light source from a close-in object.

In another embodiment, proper vergence is achieved for a robot using techniques based on magnetic forces. For example, the close-in object may be magnetic, and the eye/shell may include properly positioned magnets/electromagnets and/or material attracted to a nearby magnetic so that the each of the robot's eyes toe-in as appropriate to direct the center of the eye opening (or center axis of the eye) toward the close-in magnetic object. In one useful implementation, the robotic eye may be fabricated to match or based on the teaching of an electromagnetic eye described in U.S. Pat. Nos. 9,776,097 and/or 10,179,040, which are hereby incorporated herein in its entirety by reference.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, with reference to FIG. 1, a robot system 100 was described in which an image 162 was processed to identify or find faces of people in a space about a robot (e.g., in the robot's field of view). In some implementations, the image processor 170 further will include software to perform retina pattern identification (and the sensor 170 will include any additional hardware required to provide input for such software such as a retinal scanner) when a face is located in the space or in place of the face location. In this way, the system 100 can identify specific people and not just determine that a person is present nearby the robot 120. The system 100 may then further be configured to provide personal interaction between the robot 120 and the identified person.

The above description describes the concept of light emissions from a robot eyeball as being useful for providing eye contact and other eye movement controls for a robot. It should be appreciated, though, that many of the eye movement control techniques such as saccading, attention engine-based control, and so on can be implemented independently from the use of eye emissions.

As such, the inventors have contributed light-emitting eyeballs and their uses but also: (a) saccading (e.g., eyeballs of a robot that are controlled to never (or only momentarily) rest; (b) how to generate saccades; (c) an attention engine and eye movement of a robot using such an attention engine; (d) how to pick targets of attention; (e) when a robot is looking at someone, continually switching their eye direction between observing their individual eyes, nose, mouth, and so on; (f) making eyes react to events (e.g., noises, movement, and so on) even, in some cases, when the body and/or head does not move or the AI does not change focus (e.g., to have the robot glance in a direction associated with or in response to an event); (g) determining targets for eye direction by imitating an "information-gathering" approach (prioritize (spend time) on things not known, not predictable, important to predict, important for context, and so on); and (h) concepts of layering (e.g., saccade=automatic like breathing, Attention Engine=slower "conscious" focus (where attention engine can override the saccading and stare equivalent to holding breath, and the like)).

Further, it will be understood by those skilled in the art that "eye contact" also may extend to those applications in which a robot's "eyes" are covered with glasses, helmet shields, googles, and/or other eyewear or coverings that may cover the eyes or locations on a robot's head where eyes would likely be located. Hence, the techniques discussed herein may be used to for controlling such robot's head and other bodily movements to cause the robot to face in the direction where attention is intended to be directed during interaction or other operations. For example, a robot may be operated to direct their head and face and "eyes" covered with eyewear/coverings toward a first person in a group and then to move to a second object or person of attention over an interaction period. Random eye movements may be indicated by small (or larger) random movements of the robot's head (and, therefore, face) in such applications.

We claim:

1. A system for sensing and controlling eye contact with a robot, comprising:
   a robotic figure with a movable eye with a front light outlet;
   a light source positioned in the robotic figure to output light through the front light outlet of the movable eye;
   a light sensor sensing light striking surfaces in a physical space in which the robotic figure is positioned including the output light from the light source;
   an image processor processing output of the light sensor to identify a location of a target formed by the output light striking one or more surfaces in the physical space and to identify a location of a face of a human in the physical space; and
   a robot controller generating eye movement control signals for the robotic figure based on the location of the target and the location of the face to position the movable eye to provide eye contact with the human,
   wherein the light source is an infrared (IR) light source and the light sensor comprises an IR camera, and
   wherein the IR light source is mounted within an inner space of the movable eye to move with the movable eye or is mounted external to the movable eye and directs light onto a mirror positioned in the inner space.

2. The system of claim 1, wherein the light sensor is positioned external to the robotic figure.

3. The system of claim 2, wherein the light sensor comprises a first camera detecting an image of the physical space using the output light and a second camera detecting an image of the physical space using visible light and wherein the image from the first camera is used by the image processor to identify the target and the image from the second camera is used by the image processor to identify the face.

4. The system of claim 3, further including a beamsplitter positioned between the first and second cameras to receive light reflected from the physical space including a portion of the output light and to transmit a first portion of the received light to the first camera and to reflect a second portion of the received light to the second camera.

5. The system of claim 1, wherein the eye movement control signals cause an eye movement driver of the robot to position the movable eye to direct the front light outlet of the movable eye toward the location of the face, whereby the target at least partially overlaps the face.

6. The system of claim 5, wherein the eye movement control signals operate the eye movement driver to position the movable eye to direct the front light outlet of the movable eye such that the target at least periodically coincides with a location of an eye on the face.

7. The system of claim 6, wherein the eye movement control signals further include signals causing the eye movement driver to, during the eye contact with the human, move the movable eye to provide at least one of saccades, smooth pursuit movements, vergence movements, and vestibulo-ocular movements during movements of a head of the robot containing the movable eye.

8. The system of claim 7, wherein the signals causing the eye movement driver to, during the eye contact with the human, move the movable eye to provide at least one of saccades, smooth pursuit movements, vergence movements, and vestibulo-ocular movements during movements of a head of the robot containing the movable eye are generated based on values processed by an attention engine, the values being defaults values or defined by human input to match a character or a personality type.

9. A system for sensing and controlling eye contact with a robot, comprising:
   a robot with a head including first and second eyes positionable with eye movement drivers;
   a light source positioned in the first eye of the robot and mounted for moving with the first eye and for outputting light from the first eye along a center axis of the first eye;
   a first camera capturing an image of a space in field of view of the robot based on the light from the first eye;
   a second camera capturing an image of the space based on visible light from a source external to the robot, wherein a human observer is positioned in the space;
   an image processor processing the images from the first and second cameras to locate a targeted area in the space illuminated by the light from the first eye and a face of the human observer; and
   a controller running an eye movement module generating control signals for the eye movement drivers to cause the targeted area illuminated by the light from the first eye to move at least partially onto the face of the human observer,
   wherein the light source is an infrared (IR) light source and the first camera comprises an IR camera or the light source is a laser and the first camera comprises a camera configured to detect light from the laser.

10. The system of claim 9, wherein the control signals are generated to cause the targeted area to be moved onto a portion of the face of the human observer determined by the image processor to contain eyes of the human observer.

11. The system of claim 10, wherein the control signals are generated to move the first and second eyes of the robot to move the targeted area away from and back to the portion of the face of the human observer over an operating time period.

12. The system of claim 9, wherein the control signals include signals causing the eye movement drivers to, during eye contact with the human observer, move the first and second eyes to provide at least one of saccades, smooth pursuit movements, vergence movements, and vestibulo-ocular movements during movements of the head of the robot containing the first and second eyes.

13. An eye contact method for controlling a robot, comprising:
   operating a light source in a robotic figure to output light from a movable eye, wherein the light source is mounted within an inner space of the movable eye to move with the moveable eye, and is an infrared (IR) source or a laser;
   sensing illumination of a target area by the output light in a physical scene;
   detecting a location of an object in the physical scene, wherein the detecting is performed by an IR camera when the light source is an IR source and by a camera configured to detect light from the laser when the light source is a laser;
   determining the robot is to attend to the object; and
   moving the movable eye to move the target area to the location of the object.

14. The method of claim 13, wherein the object is a human face and wherein the location of the object includes an area of the human face including a human eye to provide eye contact.

15. The method of claim 14, wherein the determining the robot is to attend to the object comprises:
   receiving sensor data including a plurality of identified objects in the physical scene including the object;

assigning a base value to each of the identified objects; and selecting the object based on a comparison of the assigned base values.

16. The method of claim 15, further comprising determining properties of a subset of the identified objects, wherein the properties are each associated with an increased value, and wherein the method further includes adding the increased value to the base values of associated ones of the identified objects prior to the selecting the object based on the comparison.

17. The system of claim 15, wherein the determining the robot is to attend to the object further comprises reducing the base value assigned to the object over time and reperforming the selecting step until another one of the identified objects is chosen for attention of the robot based on a comparison of the assigned base values.

* * * * *